USOO5812206A

United States Patent [19]
Sarginson

[11] Patent Number: 5,812,206
[45] Date of Patent: Sep. 22, 1998

[54] BROADCAST RECEIVER SYSTEM

[75] Inventor: Peter Ashley Sarginson, Morecambe, United Kingdom

[73] Assignee: British Broadcasting Corporation, London, United Kingdom

[21] Appl. No.: 828,808

[22] PCT Filed: May 30, 1991

[86] PCT No.: PCT/GB91/00863

§ 371 Date: Jan. 24, 1992

§ 102(e) Date: Jan. 24, 1992

[87] PCT Pub. No.: WO91/19391

PCT Pub. Date: Dec. 12, 1991

[30] Foreign Application Priority Data

May 30, 1990 [GB] United Kingdom .................... 9012005

[51] Int. Cl.$^6$ ....................................................... H04N 5/76
[52] U.S. Cl. ............................ 348/460; 358/335; 348/478
[58] Field of Search ......................... 371/2.1, 2.2; 341/23, 341/30; 360/33.1, 69; 358/335, 142, 147, 180; 348/460, 734, 906, 473, 476, 478; H04N 7/08, 7/087, 5/76, 5/78, 5/782, 5/93

[56] References Cited

U.S. PATENT DOCUMENTS 4,891,703  1/1990  Noudon ................................... 358/147

FOREIGN PATENT DOCUMENTS

| 0337336 | 10/1989 | European Pat. Off. ....... H04N 7/087 |
| WO 90/00847 | 1/1990 | European Pat. Off. . |
| 56-169183 (A) | 12/1981 | Japan . |
| 2038145 | 11/1979 | United Kingdom . |
| 2192743 | 4/1987 | United Kingdom . |
| 2191643 | 6/1987 | United Kingdom . |
| 2196517 | 10/1987 | United Kingdom . |
| 2223899 | 9/1988 | United Kingdom . |
| 2223899 | 4/1990 | United Kingdom . |
| 0007844 | 7/1990 | WIPO ............................. H04N 5/782 |

OTHER PUBLICATIONS

Chien et al. "Coding System Involving Frequencies of Letters and Letter Pairs" IBM Technical Disclosure Bulletin vol. 7, No. 7 Dec. 1964.

Sommerhauser, Funkschau, vol. 57, No. 25, Dec. 1985, "Flexible Programmieren Mit VPS", pp. 47–51.

Harder et al., Fernseh & Kino Technik, vol. 39, No. 6, pp. 284–286, Jun. 1985, "Einfacher Generator Zur Erzeugung Der VPS–Sendedaten".

Hofmann, G. and Oberlies, Karl–Ulrich, "WDR–Videotext" MIT Neunen Moglichkeiten, 579 RTM—Rundfunktechnische Mitteilungen, 32 (1988) Marz/Apr., No. 2.

Chambers, J.P., "A Domestic Television Programme Delivery Service Based on Teletext", Conference of Scientific Society for Telecommunication, Jun. 1990.

*Primary Examiner*—David E. Harvey
*Attorney, Agent, or Firm*—Robert F. O'Connell; Kevin J. Fournier; Milton Oliver

[57] ABSTRACT

A broadcast receiver is disclosed which separates 16-bit binary program labels from a transmitted television signal and applies the television signal to a recorder. The viewer enters, via a keyboard, short program labels which up to three decimal digits in length. These entered short labels are then converted into 16-bit binary program codes by a mapping function processor. Each of the 16-bit codes differs in at least two binary positions from any other 16-bit codes. These codes are stored and compared with received codes and when they agree the video recorder is controlled so as to record the TV signal. Thus, the viewer does not have to enter long codes but can use short labels to identify the programs. The short labels can be obtained by the viewer from a printed TV listing.

14 Claims, 1 Drawing Sheet

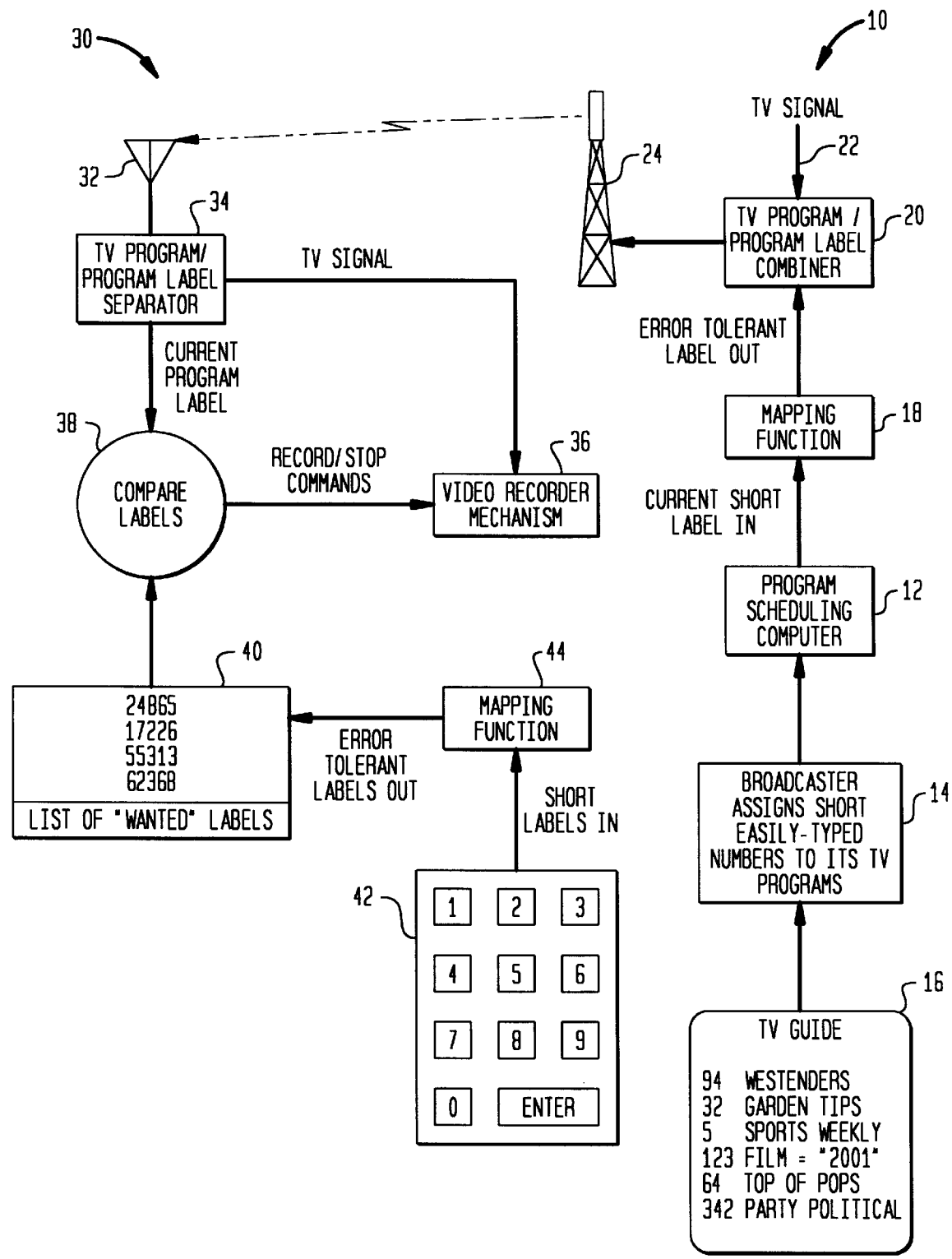

BROADCAST RECEIVER SYSTEM

BACKGROUND OF THE INVENTION

Methods of automatic programme delivery for broadcast services are currently known from European Broadcasting Union, Brussels, "Specification of the Domestic Video Programme Delivery Control System", Tech. 3263-E, August 1990, previously published May 1989 as Annex 2, Doc. Ref: SPB 459 rev. Typically, these services use different 16-bit programme labels to provide unique identification of each programme.

In one implementation, the viewer may enter, by means of a keypad, the labels of the programmes he or she wishes to be automatically recorded. When the receiver detects the presence of a desired label, the video recorder is set to "record" mode. Using such a system the desired programmes will still be correctly recorded even if their transmission is delayed or re-scheduled.

There is a conflict of interests between the values chosen for programme labels by the broadcaster and those easily entered by the viewer. In the example, the broadcaster has 65,536 possible 16-bit binary numbers available. Of these, the broadcaster would be well advised to choose a subset whose bit patterns, over a period of several days, differ from each other in at least two positions. This reduces the risk of a single bit error imitating a wanted label and so causing the false triggering of a video recorder. On the other hand, if, as is common, decimal digit entry is used and leading zeros are not necessary, the use of low value numbers would be of great advantage to the viewer. Low value numbers also take up little room when printed in a television (TV) programme listing and are less susceptible to publishing error.

Video recorders are known from European Patent Applications EP-A-0 133 985 and EP-A-0 122 626 which are provided with a bar code reader which can be used by the viewer to enter programme schedule data into a memory. This data is compared with transmitted signals to determine which programmes are to be recorded and to control a recorder accordingly. This overcomes the problem of long codes because the viewer does not have to enter them, but at the expense of a bar code reader associated with each receiver.

United Kingdom Patent Application GB-A-2 192 743 describes a unit which recovers video recorder type commands from an off-air TV signal, and generates infra-red signals representing RECORD and STOP which mimic the signals generated by a normal remote control unit. This does not assist in the problem of entering 16-bit programme labels by the viewer. A code converter is described in United Kingdom Patent Application GB-A-2 191 643 which receives a generalised PLAY command from a remote controller and converts it to a specific PLAY command required to activate the currently selected one of a number of video sources, all controllable by the same remote control unit. It is of course known to add increased error protection to digital data transmissions by adding protection bits, allowing erroneous data to be detected and possibly corrected at a receiver, see e.g. United Kingdom Patent Application GB-A-2 038 145. It has also been proposed to add bits to a digital data stream in order to label it and facilitate its subsequent identification, see e.g. United Kingdom Patent Application GB-A-2 196 517.

SUMMARY OF THE INVENTION

The invention is defined in the independent claims appended hereto, to which reference should now be made. Advantageous features are defined in the dependent claims.

The problem is solved in accordance with this invention by defining a function that maps input decimal numbers at the low end of the range, such as 0 to 999, to output numbers chosen from the full range of 0 to 65,535 and having markedly different bit patterns. Thus if low order numbers from the range 0 to 999 are input to the function, the corresponding output numbers are well spaced over the range 0 to 65,535. This allows the labels to be entered by the viewer with fewer keystrokes than would otherwise be needed.

However, the function preferably should also accept input numbers in the remainder of the range up to 65,535. This allows a broadcaster to publish four- or five-digit (decimal) programme labels if (in this example) the one thousand labels with three or fewer digits are insufficient to cover a particularly programme-intensive period. In this case, the corresponding output numbers must still be unique but they can no longer be guaranteed to differ from each other in at least two (binary) bit positions. In a practical system, the function would obviously need to be specified and provided in all decoders as well as being used by the broadcaster compiling the 16-bit (binary) labels for transmission.

A one-to-one mapping function is used, i.e. each possible input value maps onto a unique output value, and vice versa.

Such a function may be implemented as a look-up table. The input number specifies the location within the table at which the output number can be found. Alternatively, suitable mapping functions based on modulo-2 arithmetic may be found.

It will be apparent that the method described provides the broadcaster with well spaced, error tolerant, 16-bit numbers and the viewer with short, easily-typed programme labels. However, the method does not restrict the broadcaster to a subset of the 65,536 possible programme labels. Indeed all 65,536 values may be used, when appropriate, at the expense of a little extra keying on behalf of the viewer.

The system can be applied to any programme delivery service, (i.e. VPS, or format 1 or 2), including radio programmes to be recorded on an audio recorder. It makes the manual selection of programmes quicker, simpler, and less likely to error, and reduces the apparent complexity of keyboard entry. It is particularly applicable to subscription television.

BRIEF DESCRIPTION OF THE DRAWING

The sole FIGURE in the drawing is a diagrammatic block schematic of a broadcast transmitter together with a receiver embodying the invention.

DETAILED DESCRIPTION OF THE PREFERRED EMBODIMENT

The accompanying drawing shows a programme delivery control (PDC) system embodying the invention comprising a transmitting station 10 and a receiving station 30. The transmitting station includes a programme scheduling computer 12 which is controlled by the broadcaster 14 who assigns to each television programme an identification number called a programme label. These are short easily-typed numbers, and are printed in the TV Guide as illustrated diagrammatically at 16.

The computer outputs the current short label for each programme and a mapping function processor 18 converts this to a full 16-bit binary code. This is combined in a combiner 20 with a television signal received at an input 22 and applied to the transmitter 24. Typically the programme label is continuously carried as a part of the broadcaster's teletext service data.

At the receiver 30 the signal is received by an antenna 32 and processed in conventional fashion by circuits not shown. A separator circuit 34 separates the 16-bit programme label from the TV signal and applies the TV signal to a video recorder 36. The extracted programme labels are applied to a label comparison circuit 38, where they are compared with a list of wanted labels held in a stoke 40. So long as the current programme label matches one of the stored labels, the video recorder records the received TV signal. When the current programme label no longer matches any wanted labels, the video recorder stops recording. The wanted labels are entered into the store 40 by the user keying the short labels on a keypad 42. The keypad has ten keys 0 to 9 and an ENTER key, thus permitting codes of varying length to be entered.

These are applied to a mapping function processor 44 which mirrors the operation of the processor 18 at the transmitter and converts the short labels to the full 16 bit labels.

As noted above, the broadcaster assigns to each TV programme a short, easily typed number. It is this number which is published adjacent to the programme entry in a TV guide. When the programme is broadcast, the mapping function is used to transform the short number into a more error tolerant value suitable for transmission along with the TV programme. The mapping function is also used within the receiver to transform short, easily-typed numbers entered by the viewer into their error tolerant equivalents. These may then be compared with the currently received programme label to determine whether or not to record the current TV programme.

In principle, as an alternative the received programme labels could be applied to an inverse mapping function to convert them to the short label form and the short labels then compared. In practice such comparison would mean re-conversion to binary, and the arrangement illustrated is preferred.

Two specific examples of the implementation of the mapping function will now be given.

I. Example using a look-up table.

Low value, user-friendly input numbers which map onto output numbers whose bit patterns differ greatly from each other may be stored in a read-only memory. A suitable look-up table is set out in Table 1.

TABLE 1

| Decimal No. keyed by viewer | Binary equivalent input to mapping function | Broadcaster preferred output values for transmission |
|---|---|---|
| "0" | 0000000000000000 | 0000000000000000 |
| "1" | 0000000000000001 | 1111111111111111 |
| "2" | 0000000000000010 | 1010101010101010 |
| "3" | 0000000000000011 | 0101010101010101 |
| "4" | 0000000000000100 | 1010101011111111 |
| "5" | 0000000000000101 | 0101010100000000 |
| "998" | 0000001111100110 | 1001011011110010 |
| "999" | 0000001111100111 | 0011011001010001 |
| "65533" | 1111111111111101 | 0011011001010011 |
| "65534" | 1111111111111110 | 0011001000010011 |
| "65535" | 1111111111111111 | 1011001000010011 |

As is seen, four and five digit numbers keyed by the viewer still result in unique output values but with less markedly different bit-patterns:

II. Example using Modulo-2 Arithmetic

The following Table 2 demonstrates how modulo-2 based arithmetic may be used to transform low value consecutive 16-bit binary numbers into output values whose bit patterns differ markedly from neighbouring values. The algorithm assumes a 16-bit input number with individual bit positions labelled 0 (Least Significant Bit) to 15 (Most Significant Bit).

TABLE 2

| | If this bit is set . . . | then invert these bits . . . |
|---|---|---|
| STEP 1) | 0 | 15,14,13,12,11,10,9,8,7,6,5,4,3,2,1 |
| STEP 2) | 1 | 15,13,11,9,7,5,3 |
| STEP 3) | 2 | 7,6,5,4 |
| STEP 4) | 3 | 11,10,9,8 |
| STEP 5) | 4 | 15,14,13,12 |
| STEP 6) | 5 | 8,7,6 |
| STEP 7) | 6 | 11,10,9 |
| STEP 8) | 7 | 14,13,12 |

The algorithm is followed through step by step. Each step is completed and appropriate bit inversions performed before proceeding to the following step. Some input and corresponding output values are tabulated in Table 3 below.

TABLE 3

| Input number | | Output number | |
|---|---|---|---|
| (decimal) | (binary) | (decimal) | (binary) |
| 0 | 0000 0000 0000 0000 | 0 | 0000 0000 0000 0000 |
| 1 | 0000 0000 0000 0001 | 23143 | 0101 1010 0110 0111 |
| 2 | 0000 0000 0000 0010 | 43626 | 1010 1010 0110 1010 |
| 3 | 0000 0000 0000 0011 | 61453 | 1111 0000 0000 1101 |
| 4 | 0000 0000 0000 0100 | 61748 | 1111 0001 0011 0100 |
| 5 | 0000 0000 0000 0101 | 43859 | 1010 1011 0101 0011 |
| 6 | 0000 0000 0000 0110 | 23390 | 0101 1011 0101 1110 |
| 7 | 0000 0000 0000 0111 | 313 | 0000 0001 0011 1001 |
| 8 | 0000 0000 0000 1000 | 3848 | 0000 1111 0000 1000 |
| 65533 | 1111 1111 1111 1101 | 43627 | 1010 1010 0110 1011 |
| 65534 | 1111 1111 1111 1110 | 23142 | 0101 1010 0110 0110 |
| 65535 | 1111 1111 1111 1111 | 1 | 0000 0000 0000 0001 |

It will be noted that this is a one-to-one transform, in that each possible input value produces a unique output value. The function is reversible; output values may be transformed back to their input values simply by executing the steps of algorithm in reverse. Other similar transforms may be defined by assigning different bits to be inverted at each step.

I claim:

1. A broadcast receiver system including:

means for receiving a broadcast signal and providing a programme output representative of a broadcast programme;

means for identifying programme labels in the received broadcast signal;

means for entering selected programme labels for a selective control function, the entered selected programme labels comprising decimal digits;

means for storing data relating to the entered selected programme labels; and means for comparing the stored and received programme labels; wherein the improvement comprises:

label conversion means for transcoding at least some of the labels entered via the entering means such that the entered selected programme labels comprise less decimal digits than the number of decimal digits necessary to represent all of the corresponding programme labels that can be transmitted in the received broadcast signal.

2. A system according to claim 1, in which the label conversion means comprises a look-up table.

3. A system according to claim 1, in which the label conversion means comprises modulo-2 processing means.

4. A system according to claim 1, in which the control function comprises the operation of a recorder for recording the received programme.

5. A system according to claim 1, in which the label conversion means is coupled between the entering means and the storing means.

6. A system according to claim 1, in which the label conversion means is coupled between the entering means and the comparing means.

7. A broadcast receiver system including:

means for receiving a broadcast signal and providing a programme output representative of a broadcast programme;

means for identifying programme labels in the received broadcast signal;

means for entering selected programme labels for a selective control function, the entered selected programme labels comprising decimal digits;

means for storing the entered selected programme labels; and means having two inputs for receiving and comparing the stored and received programme labels respectively; wherein the improvement comprises:

label conversion means for transcoding on a one-to-one basis at least some of the labels to be to be applied to one of said inputs of the comparing means such that the selected entered programme labels may comprise less decimal digits than the number of decimal digits necessary to represent all of the corresponding programme labels that can be transmitted in the received broadcast signal, said corresponding programme labels differing from each other in at least two binary bit positions.

8. A system according to claim 7, in which the label conversion means is coupled between the entering means and the storing means.

9. A system according to claim 7, in which the selected entered programme labels further comprise all possible labels which can be identified by the number of bits in the received programme labels.

10. A broadcast transmitter system including:

means for generating a television signal for broadcasting;

means for allocating programme labels to programmes in the television signal, the programme labels comprising decimal digits; and means for combining programme labels with the television signal for transmission; wherein the improvement comprises:

label conversion means coupled between the allocating means and the combining means for transcoding on a one-to-one basis short-code programme labels allocated by the allocating means to transmission programme labels, the number of decimal digits necessary to represent all of the possible transmission programme labels being greater than the number of decimal digits in the short-code programme labels.

11. A broadcast receiver system, comprising:

means for receiving broadcast signals which include programme outputs representative of broadcast programmes and long programme labels identifying said programme outputs;

means for user entry of user labels which are shorter than said long programme labels;

means having two label inputs for comparing labels applied thereto and providing an output when said labels correspond;

a first label signal path coupled between said receiving means and said comparing means, said first label signal path including means for extracting said long programme labels from said received broadcast signals;

a second label signal path coupled between said user entry means and said comparing means, said second signal path including label storing means for storing labels therein corresponding to said user labels entered at said user entry means; and transcoding means coupled in one of said first and second signal paths for transcoding between short and long labels whereby said user labels comprise less digits than the number of digits necessary to represent all of the corresponding identifying programme labels that can be transmitted in the received broadcast signals when expressed in the same form of representation as said user labels, which corresponding programme labels differ from each other in at least two binary bit portions.

12. A system according to claim 11, in which said transcoding means is located in said second signal path, between said user entry means and said label storing means.

13. A system according to claim 11, in which said selected entered programme labels further comprise all possible labels which can be identified by the number of bits in the received wrogramme labels.

14. The system of claim 11 wherein the user labels contain decimal digits.

* * * * *